US012297750B2

(12) United States Patent
Deshmukh et al.

(10) Patent No.: US 12,297,750 B2
(45) Date of Patent: May 13, 2025

(54) FLUID DUCTS INCLUDING A RIB

(71) Applicant: General Electric Company, Schenectady, NY (US)

(72) Inventors: Nishita Deshmukh, Bengaluru (IN); Deepak Ghiya, Bengaluru (IN); Reddi Hari Prasad Reddy Mylapalli, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/105,393

(22) Filed: Feb. 3, 2023

(65) Prior Publication Data

US 2024/0191630 A1 Jun. 13, 2024

(30) Foreign Application Priority Data

Dec. 9, 2022 (IN) ............................. 202211071198

(51) Int. Cl.
*F01D 25/12* (2006.01)
*F01D 9/02* (2006.01)

(52) U.S. Cl.
CPC ............. *F01D 9/023* (2013.01); *F01D 25/12* (2013.01); *F05D 2260/22141* (2013.01)

(58) Field of Classification Search
CPC . F01D 9/023; F01D 25/12; F05D 2260/22141
See application file for complete search history.

(56) References Cited

U.S. PATENT DOCUMENTS 1,031,766 A 7/1912 Yost
1,525,682 A * 2/1925 Lowry ..................... B01D 1/02 165/169
4,195,474 A * 4/1980 Bintz ...................... F01D 9/023 165/169
4,314,587 A 2/1982 Hackett
5,293,922 A 3/1994 Imai et al.
6,018,950 A * 2/2000 Moeller .................. F23R 3/002 60/757
6,602,053 B2 * 8/2003 Subramanian ........... C25D 1/02 416/241 B
6,853,555 B2 * 2/2005 Fichera ................. H01L 23/473 257/E23.098

(Continued)

FOREIGN PATENT DOCUMENTS

KR 101987743 B1 6/2019

*Primary Examiner* — David E Sosnowski
*Assistant Examiner* — Theodore C Ribadeneyra
(74) *Attorney, Agent, or Firm* — Dinsmore & Shohl LLP

(57) ABSTRACT

A fluid duct includes a body and an elongate rib. The body extends along a central axis and defines a lumen configured to receive a first fluid extending therethrough. The body has an inner surface and an outer surface. The central axis defines an axial direction along the central axis, a radial direction perpendicular to the central axis, and a circumferential direction oriented rotationally about the central axis. The elongate rib is positioned on the inner surface of the body and extends radially inward from the inner surface of the body. The elongate rib defines a channel extending through the elongate rib in a primary direction. The channel is configured to receive a second fluid and isolate the second fluid from the first fluid.

20 Claims, 6 Drawing Sheets

(56) References Cited

U.S. PATENT DOCUMENTS

| | | | | |
|---|---|---|---|---|
| 8,307,654 | B1 * | 11/2012 | Liang | F01D 9/023 60/752 |
| 8,720,204 | B2 * | 5/2014 | Schilp | F23R 3/06 60/725 |
| 9,624,779 | B2 * | 4/2017 | Schick | F01D 5/187 |
| 10,280,792 | B2 | 5/2019 | Gons | |
| 10,697,075 | B2 | 6/2020 | Schmitt et al. | |
| 10,697,076 | B2 | 6/2020 | Millward et al. | |
| 10,829,205 | B2 | 11/2020 | Reckzeh et al. | |
| 11,131,247 | B2 | 9/2021 | Kray et al. | |
| 2010/0316492 | A1 * | 12/2010 | Charron | F01D 9/023 415/182.1 |
| 2013/0219854 | A1 * | 8/2013 | Alecu | F02K 3/115 60/39.83 |
| 2014/0202170 | A1 | 7/2014 | Cook, III | |
| 2017/0184029 | A1 * | 6/2017 | Yu | F01D 25/14 |
| 2018/0058770 | A1 * | 3/2018 | Adriany | F28F 1/04 |
| 2019/0170389 | A1 | 6/2019 | Pozniak et al. | |

* cited by examiner

FLUID DUCTS INCLUDING A RIB

CROSS REFERENCE TO RELATED APPLICATION

This application claims the priority benefit of Indian Patent Application No. 202211071198, filed Dec. 9, 2022, entitled "Fluid Ducts Including A Rib," which is hereby incorporated by reference in its entirety including the drawings.

TECHNICAL FIELD

The present specification generally relates to gas turbine engines and, in particular, cooling devices for gas turbine engines.

BACKGROUND

Fluid ducts may be configured to transfer a fluid, such as air, through a portion of a gas turbine engine for the purposes of providing cooling fluid to components of the gas turbine engine. In some embodiments, the fluid ducts may be positioned within the gas turbine engine such that the outer surface of the fluid duct is subjected to environmental stresses such as elevated temperatures, vibrations, and/or the like

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1:
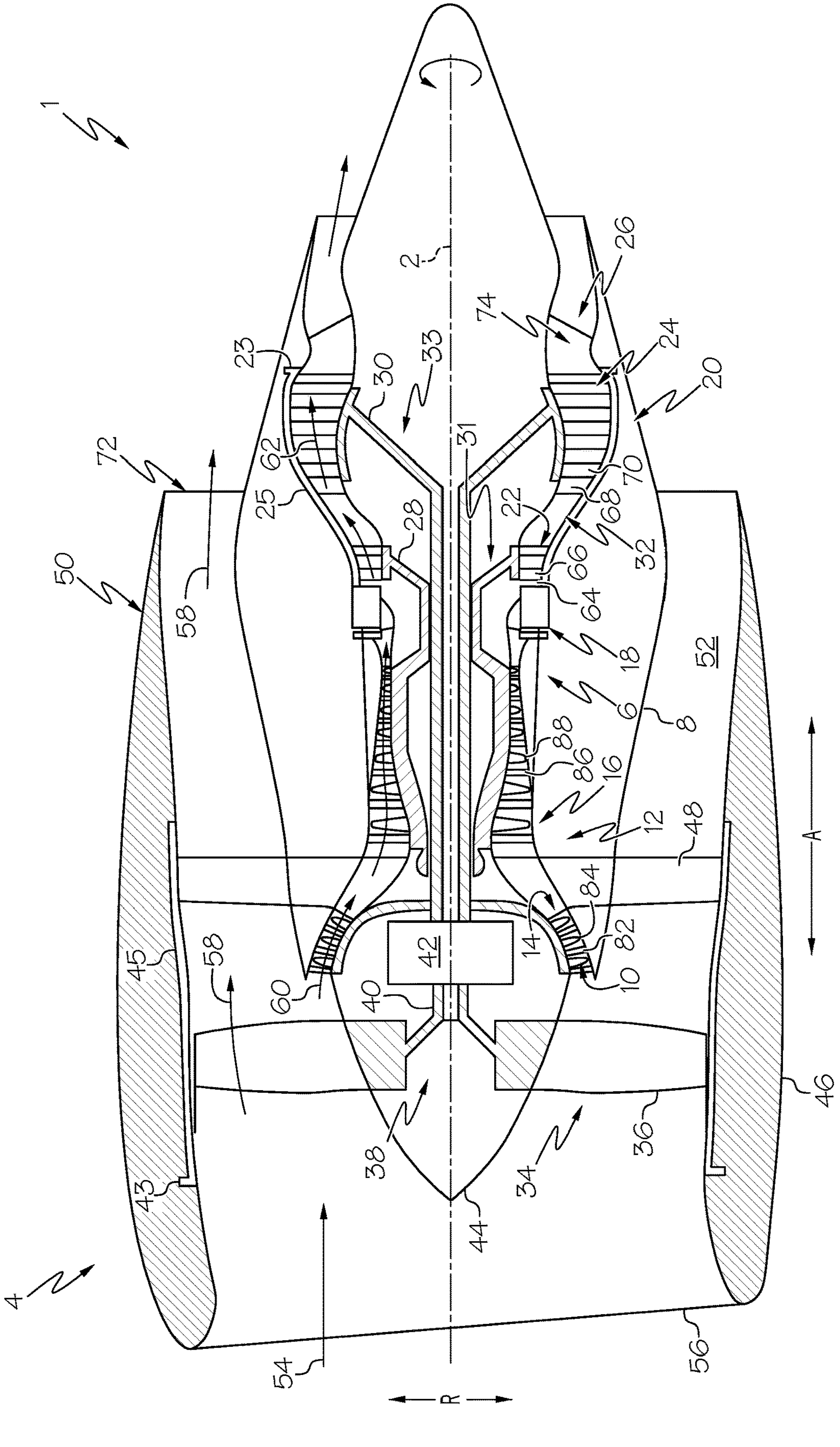
FIG. 1 schematically depicts a cross section view of an illustrative gas turbine engine, taken along an engine centerline and normal to the circumferential direction, according to one or more embodiments shown and described herein.

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Reference will now be made in detail to various embodiments of devices, assemblies, and methods, examples of which are illustrated in the accompanying drawings. Whenever possible, the same reference numerals will be used throughout the drawings to refer to the same or like parts. The present disclosure generally relates to conduit in gas turbine engine, particularly fluid ducts in a gas turbine engine having one or more ribs as depicted in FIGS. 1-9. In particular, a fluid duct may generally include a body and an elongate rib. The body may extend along a central axis and defines a lumen configured to receive a first fluid extending therethrough. The central axis may define an axial direction along the central axis, a radial direction perpendicular to the central axis, and a circumferential direction oriented rotationally about the central axis. The body may have an inner surface and an outer surface, and the elongate rib may be positioned on the inner surface of the body and may extend radially inward from the inner surface of the body. The elongate rib may define a channel extending through the elongate rib in a primary direction. The channel may be configured to receive a second fluid and isolate the second fluid from the first fluid. The elongate rib may add stiffness and/or localized wall thickness to the fluid duct and, therefore, may decrease vibration stresses and/or thermal stresses in the fluid duct. This may enable a wall thickness of the body to be thinner as compared to conventional fluid duct designs, which may decrease the overall weight of the fluid duct. Moreover, the use of additive manufacturing may enable the creation of such thinner wall thicknesses as compared to conventional fluid duct designs.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms “a,” “an,” and “the” include plural referents unless the context clearly dictates otherwise. Thus, for example, reference to “a” component includes aspects having two or more such components, unless the context clearly indicates otherwise.

FIG. 1 provides a schematic cross-sectional view of a gas turbine engine 1 according to an example embodiment of the present disclosure. For the depicted embodiment of FIG. 1, the gas turbine engine 1 is an aeronautical, high-bypass gas turbine engine configured mountable to an aircraft, such as, for example, in an under-wing configuration. As shown, the gas turbine engine 1 defines an axial direction A, a radial direction R, and a circumferential direction C. The axial direction A extends parallel to or coaxial with a longitudinal centerline 2 defined by the gas turbine engine 1.

The gas turbine engine 1 includes a fan section 4 and a core turbine engine 6 disposed downstream of the fan section 4. The core turbine engine 6 includes an engine cowl 8 that defines an annular core inlet 10. The engine cowl 8 encases, in a serial flow relationship, a compressor section 12 including a first booster (e.g., a low pressure (LP compressor 14) and a second booster (e.g., a high pressure (HP) compressor 16), a combustion section 18, a turbine section 20 including a first turbine (e.g., an HP turbine 22) and a second turbine (e.g., an LP turbine 24), and an exhaust section 26. The compressor section 12, combustion section 18, turbine section 20, and exhaust section 26 together define a core air flowpath 32 through the core turbine engine 6.

An HP shaft 28 drivingly connects the HP turbine 22 to the HP compressor 16. An LP shaft 30 drivingly connects the LP turbine 24 to the LP compressor 14. The HP shaft 28, the rotating components of the HP compressor 16 that are mechanically coupled with the HP shaft 28, and the rotating components of the HP turbine 22 that are mechanically coupled with the HP shaft 28 collectively form a high pressure spool, or HP spool 31. The LP shaft 30, the rotating components of the LP compressor 14 that are mechanically coupled with the LP shaft 30, and the rotating components of the LP turbine 24 that are mechanically coupled with the LP shaft 30 collectively form a low pressure spool, or LP spool 33.

The fan section 4 includes a fan assembly 38 having a fan 34 mechanically coupled with a fan rotor 40. The fan 34 has a plurality of fan blades 36 circumferentially-spaced apart from one another. As depicted, the fan blades 36 extend outward from the fan rotor 40 along the radial direction R. A power gearbox 42 mechanically couples the LP spool 33 and the fan rotor 40. The power gearbox 42 may also be called a main gearbox. The power gearbox 42 includes a plurality of gears for stepping down the rotational speed of the LP shaft 30 to provide a more efficient rotational fan speed of the fan 34. In other example embodiments, the fan blades 36 of the fan 34 can be mechanically coupled with a suitable actuation member configured to pitch the fan blades 36 about respective pitch axes, such as, for example, in unison. In some alternative embodiments, the gas turbine engine 1 does not include the power gearbox 42. In such alternative embodiments, the fan 34 can be directly mechanically coupled with the LP shaft 30, such as, for example, in a direct drive configuration.

Referring still to FIG. 1, the fan rotor 40 and hubs of the fan blades 36 are covered by a rotatable spinner 44 aerodynamically contoured to promote an airflow through the plurality of fan blades 36. Additionally, the fan section 4 includes an annular fan casing 45 and an outer nacelle 46 connected to the fan casing 45. The fan casing 45 and the outer nacelle 46 both circumferentially surround the fan 34 and/or at least a portion of the core turbine engine 6. The fan casing 45 and the outer nacelle 46 are supported relative to the core turbine engine 6 by a plurality of circumferentially-spaced outlet guide vanes 48. A downstream section 50 of the nacelle 46 extends over an outer portion of the core turbine engine 6 so as to define a bypass passage 52 therebetween.

During operation of the gas turbine engine 1, a volume of air 54 enters the gas turbine engine 1 through an associated inlet 56 of the nacelle 46 and/or fan section 4. As the volume of air 54 passes across the fan blades 36, a first portion of air 68 is directed or routed into the bypass passage 52 and a second portion of air 60 is directed or routed into the core inlet 10. The pressure of the second portion of air 60 is progressively increased as it flows downstream through the LP compressor 14 and HP compressor 16. Particularly, the LP compressor 14 includes sequential stages of LP compressor stator vanes 82 and LP compressor blades 84 that progressively compress the second portion of air 60. The LP compressor blades 84 are mechanically coupled to the LP shaft 30. Similarly, the HP compressor 16 includes sequential stages of HP compressor stator vanes 86 and HP compressor blades 88 that progressively compress the second portion of air 60 even further. The HP compressor blades 88 are mechanically coupled to the HP shaft 28. Additional details regarding the various components of the LP compressor 14 and the HP compressor 16 will be described in greater detail hereinbelow. The compressed second portion of air 60 is then discharged from the compressor section 12 into the combustion section 18.

The compressed second portion of air 60 discharged from the compressor section 12 mixes with fuel and is burned within a combustor of the combustion section 18 to provide combustion gases 62. The combustion gases 62 are routed from the combustion section 18 along a hot gas path 74 of the core air flowpath 32 through the HP turbine 22 where a portion of thermal and/or kinetic energy from the combustion gases 62 is extracted via sequential stages of HP turbine stator vanes 64 and HP turbine blades 66. The HP turbine blades 66 are mechanically coupled to the HP shaft 28. Thus, when the HP turbine blades 66 extract energy from the combustion gases 62, the HP shaft 28 rotates, thereby supporting operation of the HP compressor 16. The combustion gases 62 are routed through the LP turbine 24 where a second portion of thermal and kinetic energy is extracted from the combustion gases 62 via sequential stages of LP turbine stator vanes 68 and LP turbine blades 70. The LP turbine blades 70 are coupled to the LP shaft 30. Thus, when the LP turbine blades 70 extract energy from the combustion gases 62, the LP shaft 30 rotates, thereby supporting operation of the LP compressor 14, as well as the fan 34 by way of the power gearbox 42.

The combustion gases 62 exit the LP turbine 24 and are exhausted from the core turbine engine 6 through the exhaust section 26 to provide propulsive thrust. Simultaneously, the pressure of the first portion of air 58 is substantially increased (e.g., increased a measurable amount, increased 1%, increased 5%, or the like) as the first portion of air 58 is routed through the bypass passage 52 before the first portion of air 58 is exhausted from a fan nozzle exhaust section 72 of the gas turbine engine 1, also providing propulsive thrust. The HP turbine 22, the LP turbine 24, and the exhaust section 26 at least partially define the hot gas path 74.

It will be appreciated that the gas turbine engine 1 depicted in FIG. 1 is provided by way of example and that in other example embodiments, the gas turbine engine 1 may have other configurations. Additionally, or alternatively, aspects of the present disclosure may be utilized with any other suitable aeronautical gas turbine engine, such as a turbofan engine, turboshaft engine, turboprop engine, turbojet engine, etc.

Figure 2:
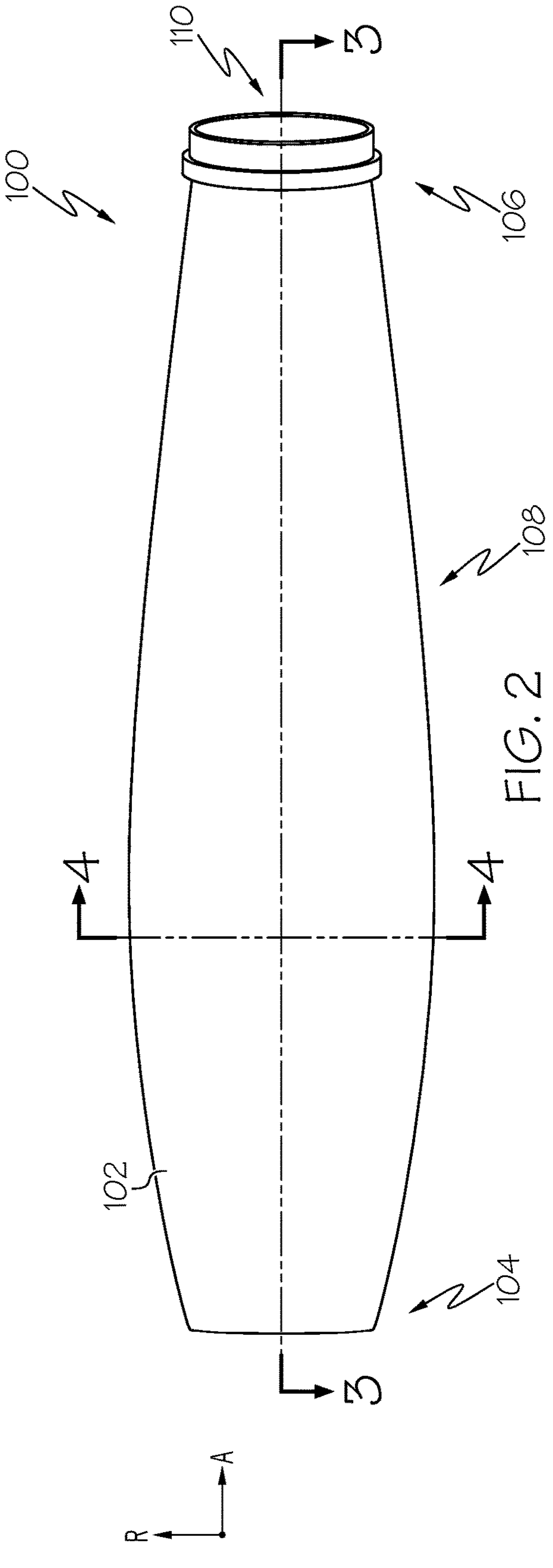
FIG. 2 schematically depicts side perspective view of an illustrative fluid duct, according to one or more embodiments shown and described herein.

Referring to FIGS. 1 and 2 in combination, a fluid duct 100 is schematically depicted. The fluid duct 100 may have a body 102 extending from a forward end 104 to an aft end 106 along a central axis L. The body 102 may have a tubular shape defining a lumen 110 extending through the body 102. The lumen 110 may be configured to pass a fluid, such as air, from the forward end 104 of the body 102 to the aft end 106 of the body 102. In some embodiments, the fluid duct 100 may be assembled within a gas turbine engine, such as the gas turbine engine 1 described hereinabove. In such embodiments, the fluid duct 100 may be positioned within the gas turbine engine 1 between the compressor section 12 and the turbine section 20. In particular, the forward end 104 may fluidically couple the fluid duct 100 to the compressor section 12, and the aft end 106 may fluidically coupled the fluid duct 100 to the turbine section 20. Accordingly, fluid duct 100 may be fluidly coupled between the compressor section 12 and the turbine section 20 and may route a fluid, such as air, from the compressor section 12 to the turbine section 20.

Referring to FIG. 2, the body 102 may be substantially cylindrical or rounded (e.g., within a 10% margin of being a perfect cylinder), such as depicted. In some embodiments, the body 102 may be diametrically larger at a middle portion 108 than at the forward end 104 or the aft end 106. In embodiments, the forward end 104 and/or the aft end 106 may be configured to mate with adjacent hardware.

Figure 3:
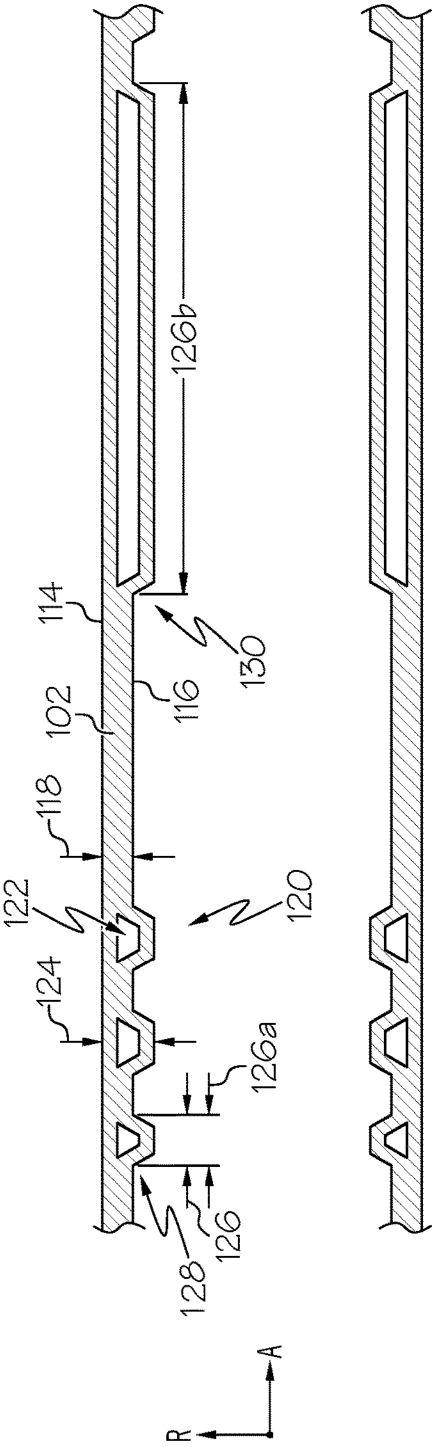
FIG. 3 schematically depicts cross sectional view of the fluid duct of FIG. 2 taken along section 3-3, according to one or more embodiments shown and described herein.

As shown in FIG. 3, the body 102 may define an outer surface 114 and an inner surface 116. The body 102 may have a substantially circular cross section (e.g., being within a 10% margin of being a perfect circle), taken along a plane orthogonal to the central axis L, such that the outer surface 114 and the inner surface 116 are each substantially circular. In other embodiments, the body 102 may not have a substantially circular cross section, taken along a plane orthogonal to the central axis L, and, instead, may have an oblong, polygonal, regular, irregular, or other shaped cross section. The body 102 may define a wall thickness 118 between the outer surface 114 and the inner surface 116.

Referring to FIGS. 1-3, the body 102 may be subjected to environmental stresses such as elevated temperatures, vibrations, and/or the like imparted by the gas turbine engine 1. In particular, the body 102 may be subjected to vibrations of the gas turbine engine 1. This may create a vibration response and, accordingly, vibration stresses in the body 102. Additionally, the outer surface 114 of the body 102 may be subjected to elevated temperatures while the inner surface 116 may be subjected to cooler temperatures of the fluid routed through the lumen 110. This may create a thermal gradient and, accordingly, thermal stresses acting on the fluid duct 100. Accordingly, the wall thickness 118 may be sized to accommodate both thermal and vibration loads imparted by the gas turbine engine 1.

The fluid duct 100 may include one or more ribs 120 coupled to the body 102. In some embodiments, the one or more ribs 120 may be coupled to the inner surface of the body 102, such as depicted. However, as will be described in greater detail herein, other orientations of the ribs 120 are contemplated and possible. The one or more ribs 120 may be affixed to the body 102 via braze, weld, adhesive, and the like. In some embodiments, the one or more ribs 120 may formed integrally with the body 102 such that the body 102 and the one or more ribs 120 are a single, monolithic piece. This integral arrangement may be beneficial in some embodiments, as it may minimize or otherwise reduce irregular stress concentration across a joint, such as a brazed joint. Additionally, this may enable a relatively thin wall thickness 118. Specifically, the wall thickness 118 may be thinner if the wall thickness 118 need not accommodate a joint, such as a brazed joint. Accordingly, in some embodiments, the wall thickness may be less than 100 mils, less than 75 mils, or less than 50 mils. In some embodiments, the one or more ribs 120 may be formed integrally with the body 102 via additive manufacturing. This integral formation may be beneficial in some embodiments, as it may decrease manufacturing time and complexity.

As depicted, the one or more ribs 120 may extend radially inward from the body 102 (e.g. in the R direction of the depicted cylindrical coordinate system). As will be described in greater detail herein, the one or more ribs 120 may add localized stiffness and localized wall thickness to the fluid duct 100 at the location of the one or more ribs 120. This additional stiffness and wall thickness may decrease the severity of thermal gradients and/or the vibration stresses acting of the fluid duct 100. Accordingly, as will be described in greater detail herein, this may increase a life of the fluid duct 100 and may enable a thinner wall thickness 118 of the body 102.

The one or more ribs 120 may define a radial rib thickness 124 in the radial direction (e.g. in the R direction of the depicted cylindrical coordinate system). The radial rib thickness 124 may be the maximum thickness taken in the radial direction at the location of the one or more ribs 120. In embodiments, the radial rib thickness 124 may be greater than the wall thickness 118 of the body 102, may be more than two times the wall thickness 118, or more than three times the wall thickness 118. In some embodiments, each of the one or more ribs 120 may have the same radial rib thickness 124. In other embodiments, the radial rib thickness 124 may vary between the one or more ribs 120. In some embodiments, the radial rib thickness 124 may be less than 200 mils, less than 150 mils, less than 100 mils, less than 75 mils, or less than 50 mils. In other embodiments, the radial rib thickness 124 may be larger than 200 mils.

Still referring to FIG. 3, the one or more ribs 120 may extend axially along the body 102 (e.g. in the L direction of the depicted cylindrical coordinate system). Accordingly, the one or more ribs may define an axial rib width 126, as shown. In some embodiments, the axial rib width 126 may be less than 150 mils, less than 100 mils, or less than 75 mils. The axial rib width 126 may be smaller than the radial rib thickness 124, may be approximately equal to the radial rib thickness 124, or may be larger than the radial rib thickness 124. For example, in some embodiments, the axial rib width

126 may be less than 200 mils, less than 150 mils, less than 100 mils, less than 75 mils, or less than 50 mils. In other embodiments, the axial rib width 126 may be larger than 200 mils. In some embodiments, the axial rib width 126 may be more than two times the radial rib thickness 124, more than four times the radial rib thickness 124, or more than 6 times the radial rib thickness 124. In some embodiments, each of the one or more ribs 120 may have the same axial rib width 126. In other embodiments, the axial rib width 126 may vary between the one or more ribs 120. For example, as depicted in FIG. 3, the fluid duct 100 may have a first selection 128 of the one or more ribs 120 that have an axial rib width 126*a* that is a similar magnitude of the radial rib thickness 124, i.e. the axial rib width 126*a* may be less than two times the radial rib thickness 124. The fluid duct 100 may have a second selection 130 of the one or more ribs that have an axial rib width 126*b* that is substantially larger than the radial rib thickness 124, i.e. the axial rib width 126*b* may be more than two times the radial rib thickness 124. In embodiments, the axial rib width 126 and the radial rib thickness 124 may be selected to achieve a desired level of stiffness of the fluid duct 100 at the location of the one or more ribs 120.

In general, the larger the radial rib thickness 124 and the axial rib width 126, the greater the mass of the one or more ribs 120 through which heat may be distributed. This may decrease the severity of thermal gradients of the fluid duct 100 at the location of the one or more ribs 120. Accordingly, the one or more ribs 120 may decrease the thermal stress acting on the fluid duct 100 at the location of the one or more ribs 120, which may improve the life of the fluid duct 100.

The radial rib thickness 124 and the axial rib width 126 may add stiffness to the fluid duct 100 at the location of the one or more ribs 120. This may decrease the vibration response of the fluid duct 100 for a given mode shape. Accordingly, the one or more ribs 120 may decrease the vibration stress acting on the fluid duct 100, which may improve the life of the fluid duct 100. Additionally, the added stiffness to the fluid duct 100 may adjust the natural frequency of a given mode shape. This may enable the natural frequency to be shifted further away from frequencies experienced by the fluid duct 100, which may improve the life of the fluid duct 100.

However, as the radial rib thickness 124 and the axial rib width 126 increase, the weight of the one or more ribs 120 will also increase. As the weight of the one or more ribs 120 increases, the weight and, accordingly, overall efficiency of the gas turbine engine will decrease. For this reason, the radial rib thickness 124 and the axial rib width 126 may be selected to balance the benefit of additional thermal mass and additional stiffness against the detriment of increased weight.

The one or more ribs 120 may have a substantially trapezoidal cross sectional shape, taken along a plane orthogonal to the central axis L, such as depicted. However, other shapes are contemplated and possible. The one or more ribs 120 may be any round, angular, regular, or irregular shape. For example, referring briefly to FIG. 5, the one or more ribs 120' of an embodiment of a fluid duct 200 may have a T-shaped cross sectional shape, taken along a plane orthogonal to the central axis L, such as depicted. As will be appreciated by those skilled in the art, the cross sectional shape of the one or more ribs 120 may impact the stiffness added to the fluid duct 100 in one or more directions. Accordingly, the cross sectional shape of the one or more ribs 120 may be selected based on the particular geometry of the body 102 and loading conditions to add appropriate stiffness. This may decrease the vibration response of the fluid duct 100 for a given mode shape, which may decrease the vibration stress acting on the fluid duct 100. Additionally, the added stiffness may adjust the natural frequency of a given mode shape. This may enable the natural frequency to be shifted further away from frequencies experienced by the fluid duct 100. In some embodiments, the cross sectional shape of the one or more ribs 120 may be selected to accommodate a channel, such as described hereinbelow.

Referring still to FIG. 3, in embodiments, the one or more ribs 120 may be substantially hollow such that the one or more ribs 120 define a channel 122 extending through the one or more ribs 120. In particular, the one or more ribs 120 may be one or more elongate ribs that are elongated, or longest, in a primary direction. In other words, the one or more ribs 120 may define a primary direction in the direction of elongation. As shown in FIG. 3, the one or more ribs 120 are elongate ribs that are elongated in a circumferential direction about the central axis L. Accordingly, the one or more ribs 120 may define a primary direction that is circumferential. The channel 122 may extend through the one or more ribs 120 in the primary direction, e.g. circumferentially as depicted in FIG. 3, such that the channel 122 extends through an elongated length of the one or more ribs 120. Other primary directions are contemplated and possible. For example, in some embodiments, the primary direction may be longitudinal, such that the primary direction is substantially parallel to the axial direction A, may be helical, may be variable, and the like.

The channel 122 may decrease the weight of the one or more ribs 120. Accordingly, this may enable the one or more ribs 120 to provide stiffness to the fluid duct 100 while minimizing or otherwise reducing weight of the fluid duct 100. The channel 122 may be configured to allow a fluid, such as air, to pass through or be disposed within the channel 122. In particular, in some embodiments, a first fluid may be received within the lumen 110, and a second fluid may be received within the channel 122. The channel 122 may receive the second fluid and isolate the second fluid from the first fluid. In some embodiments, the second fluid within the channel 122 may provide thermal insulation or thermal cooling to the body 102. Accordingly, the channel 122 may decrease the thermal stress acting on the fluid duct 100. In other embodiments, the one or more ribs 120 may not have a channel 122 and instead may be continuous through the radial rib thickness 124.

As described hereinabove, the one or more ribs 120 may be formed integrally with the body 102 via additive manufacturing. Accordingly, the design of the one or more ribs 120 may increase in complexity, such as with the inclusion of the channel 122, with minimal increase to the cost of manufacturing. Similarly, this may enable the one or more ribs 120 to be smaller, more numerous, and more precisely located to accommodate thermal and/or vibration loads. That is, particular thermal and/or vibration loads may necessitate very particular shapes, sizes, arrangements, and/or features of ribs 120 to provide an ability to withstand the thermal and/or vibration loads. Since additive manufacturing allows for an increase in complexity (because of the ability to precisely control deposition of materials and/or minimize waste or sacrificial material), the complexity of the ribs 120 can be increased without significantly increasing the manufacturing cost.

Referring still to FIG. 3, the one or more ribs 120 may be positioned axially along the body 102 of the fluid duct 100 (e.g. in the L direction of the depicted cylindrical coordinate system). In some embodiments, the one on or more ribs 120 may be positioned abutting each other. For example, as depicted, the first selection 128 of the one or more ribs 120 are positioned abutting each other. In other embodiments, the one or more ribs 120 may be positioned such that they are axially spaced apart (e.g. in the L direction of the depicted coordinate system). In such embodiments, the one or more ribs 120 may be equally spaced apart or may be spaced apart by varying axial distances. In some embodiments, the position of the one or more ribs 120 may be selected as a function of vibration stress of the fluid duct 100. Specifically, the one or more ribs 120 may add stiffness to the fluid duct 100 and, therefore, may decrease vibration stresses in the fluid duct 100, such as described hereinabove. In this way, the placement of the one or more ribs 120 may be particularized to lessen or adjust the vibration stresses in the fluid duct 100.

Because the thermal stresses and/or the vibration stresses acting of the fluid duct 100 may be decreased by the one or more ribs 120, the one or more ribs 120 may enable a thinner wall thickness 118 of the body 102. Accordingly, in some embodiments, the wall thickness 118 may be less than 100 mils, less than 75 mils, or less than 50 mils. This may be beneficial in some embodiments as it may decrease the overall weight of the fluid duct 100.

Figure 10:
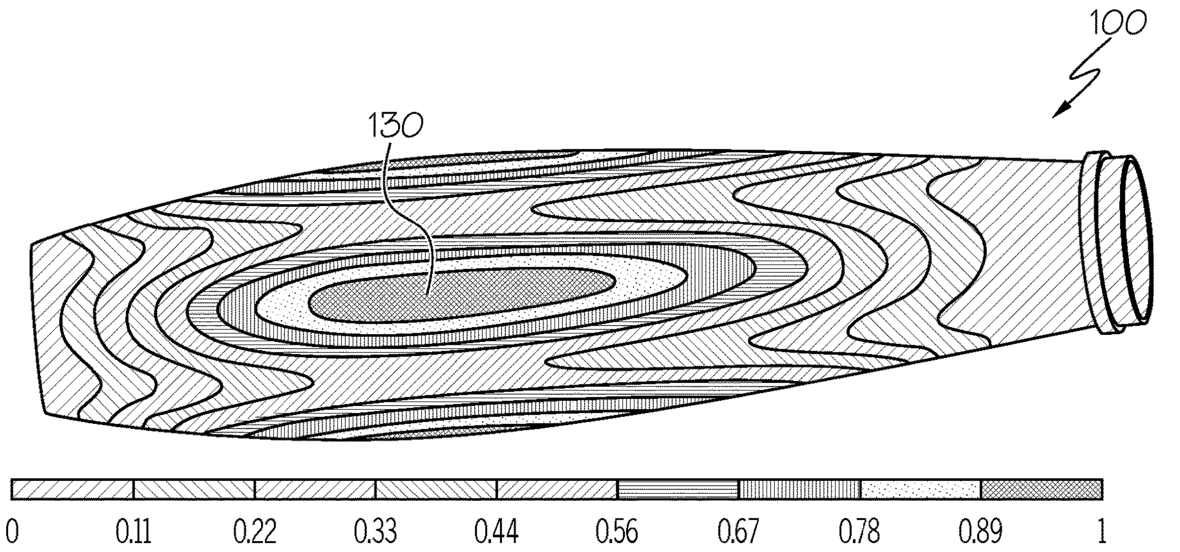
FIG. 10 schematically depicts a vibration mode of the fluid duct of FIG. 1 with deflections normalized to 1, according to one or more embodiments shown and described herein.

Referring now to FIG. 10, a vibration mode of the fluid duct 100 with a nodal diameter of 2 is schematically depicted. As shown, the fluid duct 100 may have a maximum vibration deflection location 130. In some embodiments, the one or more ribs 120 may be positioned at and/or near the maximum vibration deflection location 130. This may provide additional stiffness at the maximum vibration deflection location 130, which may decrease the magnitude of the vibration response at the maximum vibration deflection location 130 and may therefore decrease the magnitude of the vibration stress of the fluid duct 100.

Figure 11:
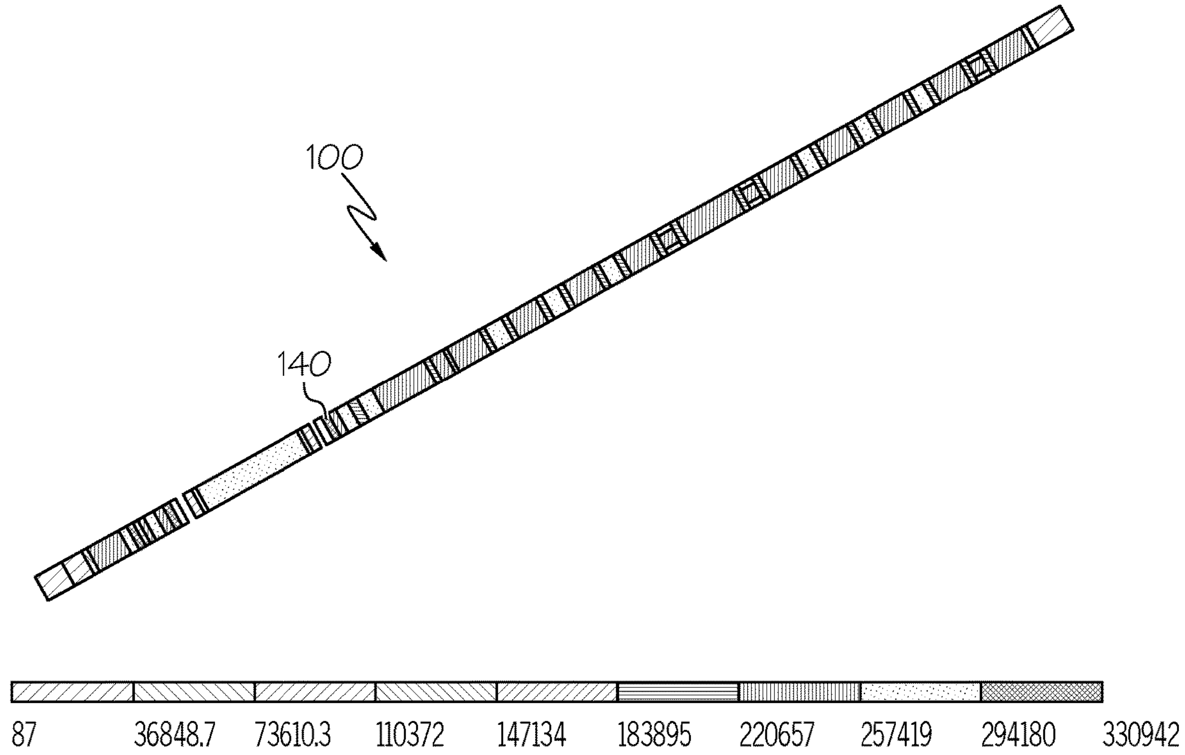
FIG. 11 schematically depicts a thermal stress plot of a section of the inner surface of the fluid duct of FIG. 1 taken along section 3-3, according to one or more embodiments shown and described herein.

Referring now to FIG. 11, a thermal stress plot of the fluid duct 100 is schematically depicted. As shown, the fluid duct 100 may have a maximum thermal stress location 140. In some embodiments, the one or more ribs 120 may be positioned at and/or near the maximum thermal stress location 140. This may provide additional mass though which heat may be distributed at and/or near the maximum thermal stress location 140. Accordingly, this may decrease the severity of thermal gradients at the maximum thermal stress location 140, which may decrease the magnitude of thermal stress of the fluid duct 100.

Figure 4:
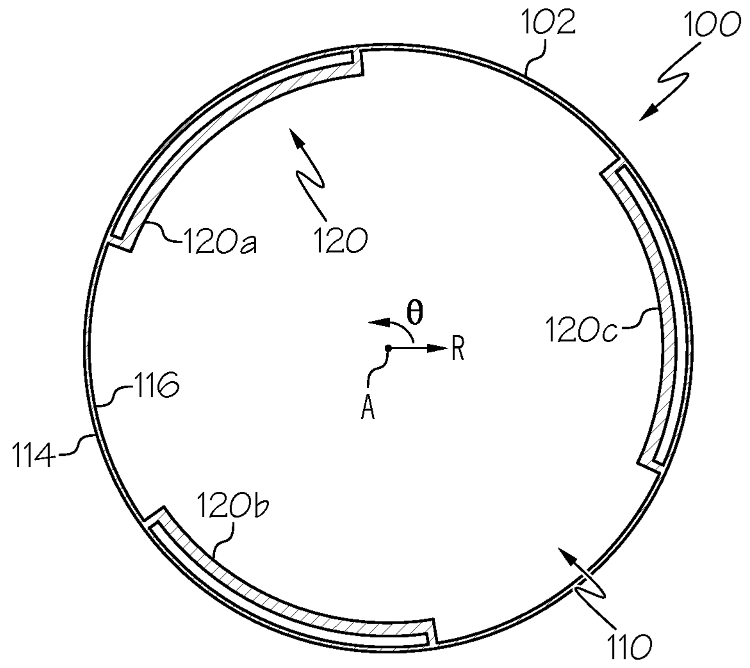
FIG. 4 schematically depicts a cross sectional view of the fluid duct of FIG. 2 taken along section 4-4, according to one or more embodiments shown and described herein.
Figure 5:
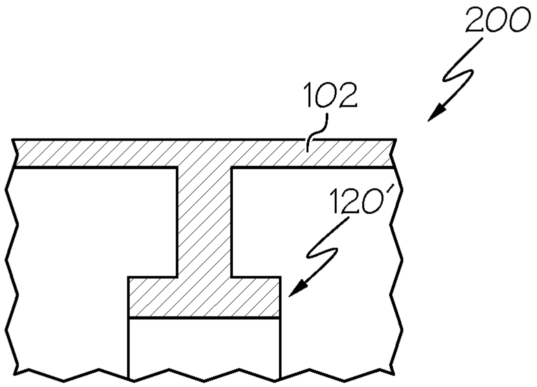
FIG. 5 schematically depicts a cross sectional view of another fluid duct, according to one or more embodiments shown and described herein.

Referring now to FIG. 4, the one or more ribs 120 may extend partially or fully about the body 102 in the circumferentially direction (e.g. in the direction θ of the depicted cylindrical coordinate system). For example, as depicted, the fluid duct 100 may have circumferentially discontinuous ribs (e.g., a first discontinuous rib 120*a*, a second discontinuous rib 120*b*, and a third discontinuous rib 120*c*), coupled to the body 102 and spaced apart in the circumferential direction. The discontinuous ribs 120*a*, 120*b*, and 120*c* may be evenly spaced apart in the circumferential direction, such as shown, or may be non-evenly spaced. In some embodiments, the discontinuous ribs 120*a*, 120*b*, and 120*c* may be placed as a function of vibration stress acting on the fluid duct 100. The discontinuous ribs 120*a*, 120*b*, and 120*c* may add stiffness to the fluid duct 100 which may minimize or relocate vibration stresses in the fluid duct 100 without adding as much weight as a similarly sized continuous rib. As depicted, the fluid duct 100 may have three discontinuous ribs (e.g., the first discontinuous rib 120*a*, the second discontinuous rib 120*b*, and the third discontinuous rib 120*c*). However, a greater or smaller number of discontinuous ribs is contemplated and possible. In other embodiments, the one or more ribs 120 may extend fully about the body 102 in the circumferential direction (e.g. in the direction θ of the depicted cylindrical coordinate system) such that the one or more ribs 120 fully encircle the lumen 110 of the fluid duct 100.

Figure 6:
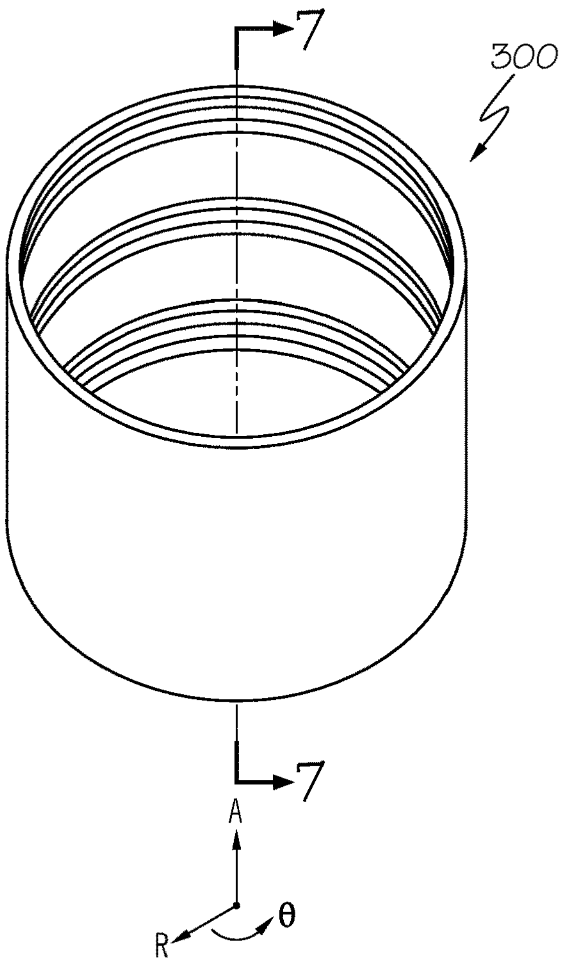
FIG. 6 schematically depicts side perspective view of another fluid duct, according to one or more embodiments shown and described herein.
Figure 7:
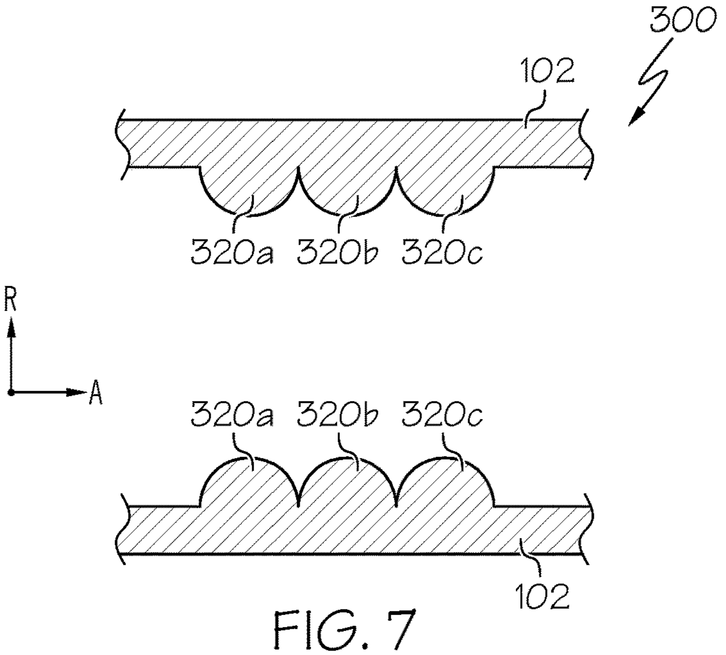
FIG. 7 schematically depicts a cross sectional view of the fluid duct of FIG. 6 taken along section 6-6, according to one or more embodiments shown and described herein.

Referring now to FIGS. 6 and 7 in combination, an embodiment of a fluid duct 300 is schematically depicted. The fluid duct 300 is substantially similar to the fluid ducts 100 and 200. Accordingly, like numbers will be used to refer to like features. For example, the fluid duct 300 may have a body 102 extending from a forward end 104 to an aft end 106 along a central axis L. The body 102 may have a tubular shape defining a lumen 110 extending through the body 102. The fluid duct 300 may have one or more ribs 320 coupled to the body 102. The one or more ribs 320 may extend radially inward from the inner surface 116 of the body 102. As shown, the one or more ribs 320 may be solid, or continuous, through the radial rib thickness 224. The one or more ribs 320 may have a substantially semi-circular shape, such as depicted. As will be appreciated by those skilled in the art, whether or not the one or more ribs 320 are continuous through the radial rib thickness 224 is not dependent upon the cross sectional shape.

In some embodiments, the one or more ribs 320 may include a plurality of ribs, such as three ribs 320*a*, 320*b*, and 320*c*. The three ribs 320*a*, 320*b*, and 320*c* may be arranged such that the three ribs 320*a*, 320*b*, and 320*c* are abutting each other in the axial direction A, such as depicted. In other embodiments, the three ribs 320*a*, 320*b*, and 320*c* may be spaced apart in the axial direction A. Although depicted as three ribs 320*a*, 320*b*, and 320*c*, the one or more ribs 320 may include a greater or smaller number of ribs.

Figure 8:
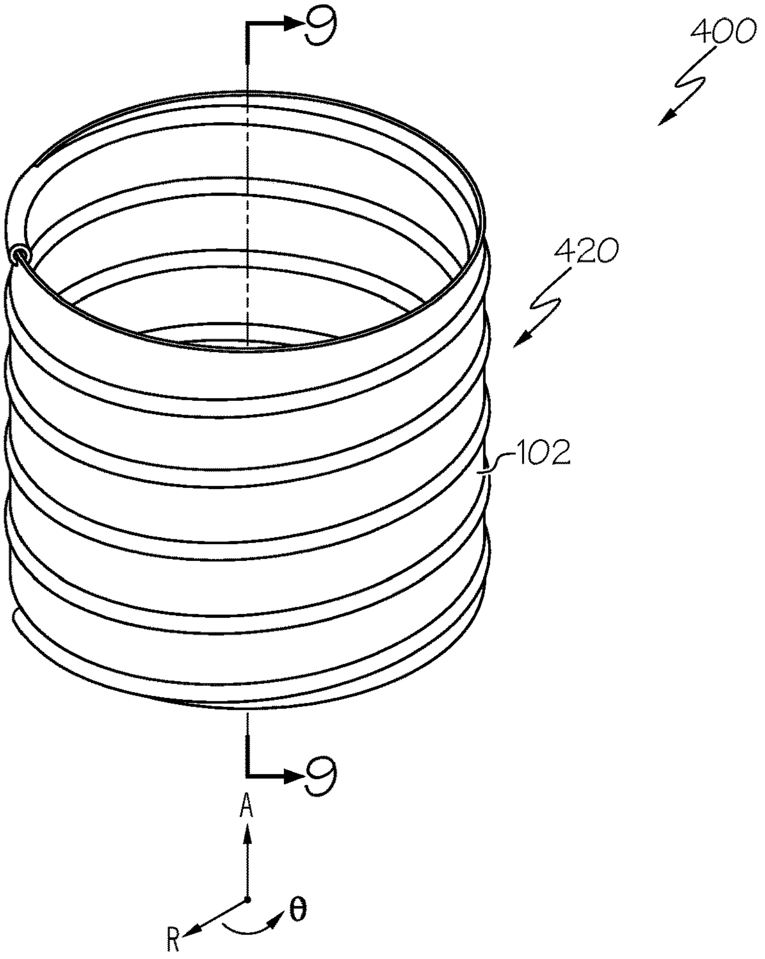
FIG. 8 schematically depicts side perspective view of another fluid duct, according to one or more embodiments shown and described herein.
Figure 9:
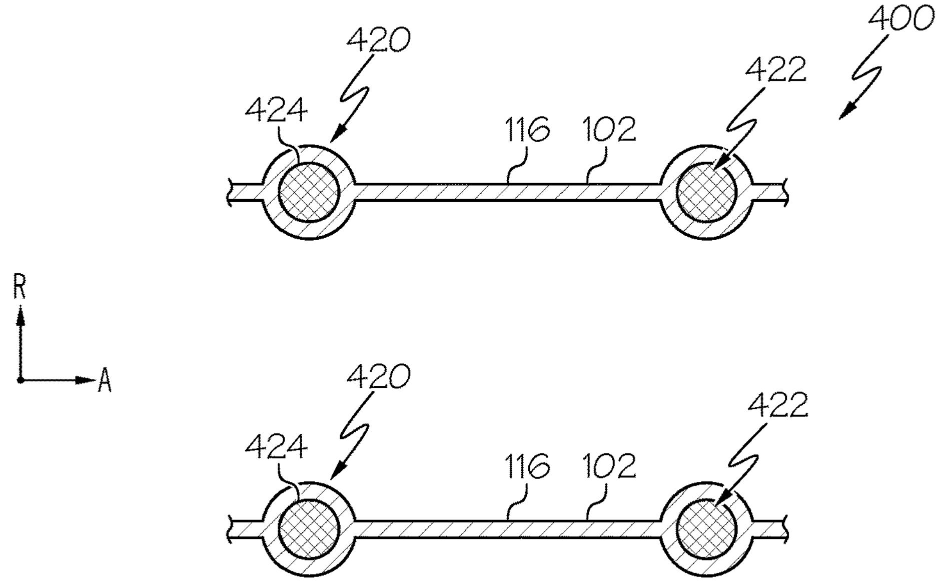
FIG. 9 schematically depicts a cross sectional view of the fluid duct of FIG. 8 taken along section 8-8, according to one or more embodiments shown and described herein.

Referring now to FIGS. 8 and 9 in combination, an embodiment of a fluid duct 400 is schematically depicted. The fluid duct 400 is substantially similar to the fluid ducts 100, 200, and 300. Accordingly, like numbers will be used to refer to like features. For example, the fluid duct 400 may have a body 102 extending from a forward end 104 to an aft end 106 along a central axis L. The body 102 may have a tubular shape defining a lumen 110 extending through the body 102. The fluid duct 400 may have one or more ribs 420 coupled to the body 102. As shown the one or more ribs 420 may be arranged helically along the body 102. Accordingly, in some embodiments, the one or more ribs 420 may be a single, continuous rib. The one or more ribs 420 may have a constant pitch, such as depicted, or a variable pitch.

The one or more ribs 420 may extend radially inward from the inner surface 116 of the body 102 and may extend radially outward from the outer surface 114 of the body 102, such as depicted. The one or more ribs 420 may have a substantially circular cross sectional shape, such as depicted. The one or more ribs 420 may be substantially hollow such that the one or more ribs 420 define a channel 422 extending through the one or more ribs 420. Disposed within the channel 422, the one or more ribs 420 may include struts 424. In some embodiments, the struts 424 may be arranged in a lattice structure. In other embodiments, the struts 424 may be arranged in an isogrid structure. In other embodiments, the struts 424 may be arranged to form a gyroid surface. The plurality of struts may provide additional stiffness to the one or more ribs 420 while minimizing the weight of the one or more ribs 420. Moreover, the plurality of struts may provide additional stiffness to the one or more ribs 420 while allowing a fluid, such as air to pass through the channel 422. This may be beneficial in some embodiments as the fluid may provide thermal insulation to the fluid duct 400. The struts may be formed integrally with the one or more ribs 420. In particular, in embodiments, the body 102, the one or more ribs 420, and the struts 424 may be additively manufactured such that the body 102, the one or more ribs 420, and the struts 424 may be a single, monolithic piece.

In view of the above, it should now be understood that at least some embodiments of the present disclosure are directed to a fluid duct that includes a body and an elongate rib. The body extends along a central axis and defines a lumen configured to receive a first fluid extending therethrough. The central axis defines an axial direction along the central axis, a radial direction perpendicular to the central axis, and a circumferential direction oriented rotationally about the central axis. The body has an inner surface and an outer surface, and the elongate rib is positioned on the inner surface of the body and extends radially inward from the inner surface of the body. The elongate rib defines a channel extending through the elongate rib in a primary direction. The channel is configured to receive a second fluid and isolate the second fluid from the first fluid. The elongate rib may add stiffness and/or localized wall thickness to the fluid duct and, therefore, may decrease vibration stresses and/or thermal stresses in the fluid duct. This may enable a wall thickness of the body to be thinner as compared to conventional fluid duct designs, which may decrease the overall weight of the fluid duct.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the present disclosure are provided by the subject matter of the following clauses:

A fluid duct, comprising: a body extending along a central axis and defining a lumen configured to receive a first fluid extending therethrough, the body having an inner surface and an outer surface, wherein the central axis defines an axial direction along the central axis, a radial direction perpendicular to the central axis, and a circumferential direction oriented rotationally about the central axis; and an elongate rib positioned on the inner surface of the body and extending radially inward from the inner surface of the body, the elongate rib defining a channel extending through the elongate rib in a primary direction, wherein the channel is configured to receive a second fluid and isolate the second fluid from the first fluid.

The fluid duct of any preceding clause, wherein the elongate rib extends radially outward from the outer surface of the body.

The fluid duct of any preceding clause, wherein the elongate rib is a circumferentially discontinuous rib extending partially about the inner surface of the body in the circumferential direction.

The fluid duct of any preceding clause, wherein the elongate rib extends fully about the inner surface of the body in the circumferential direction such that the elongate rib fully encircles the lumen.

The fluid duct of any preceding clause, wherein the elongate rib has a substantially semicircular cross sectional shape.

The fluid duct of any preceding clause, wherein the elongate rib has a substantially trapezoidal cross sectional shape.

The fluid duct of any preceding clause, wherein the elongate rib has a substantially circular cross sectional shape.

The fluid duct of any preceding clause, wherein the elongate rib has a substantially T-shaped cross sectional shape.

The fluid duct of any preceding clause, wherein the elongate rib has a substantially round cross sectional shape.

The fluid duct of any preceding clause, wherein the elongate rib has a substantially angular cross sectional shape.

The fluid duct of any preceding clause, wherein the elongate rib has a substantially regular cross sectional shape.

The fluid duct of any preceding clause, wherein the elongate rib has a substantially irregular cross sectional shape.

The fluid duct of any preceding clause, wherein the elongate rib extends helically about the inner surface of the body.

The fluid duct of any preceding clause, wherein the elongate rib comprises struts disposed within the channel, the struts forming a lattice structure.

The fluid duct of any preceding clause, wherein the elongate rib comprises a gyroid surface disposed within the channel.

The fluid duct of any preceding clause, wherein the elongate rib comprises struts disposed within the channel, the struts forming an isogrid structure disposed within the channel.

A gas turbine engine, comprising: a compressor section; a turbine section; and a fluid duct fluidly coupled between the compressor section and the turbine section, the fluid duct comprising: a body extending along a central axis and defining a lumen extending therethrough, the body having an inner surface and an outer surface, wherein the central axis defines an axial direction along the central axis, a radial direction perpendicular to the central axis, and a circumferential direction oriented rotationally about the central axis; and a plurality of ribs positioned on the inner surface of the body and extending radially inward from the inner surface of the body, each of the plurality of ribs defining a channel extending therethrough in a primary direction, wherein the channel is configured to receive a second fluid and isolate the second fluid from the first fluid.

The gas turbine engine of any preceding clause, wherein the plurality of ribs comprises a first rib and a second rib are positioned abutting each other in the axial direction.

The gas turbine engine of any preceding clause, wherein the plurality of ribs comprises a first rib and a second rib spaced apart from the first rib in the axial direction.

The gas turbine engine of any preceding clause, wherein the plurality of ribs comprises at least one circumferentially discontinuous rib extending partially about the inner surface of the body in the circumferential direction.

The gas turbine engine of any preceding clause, wherein: the at least one circumferentially discontinuous rib comprises a first discontinuous rib and a second discontinuous rib; the first discontinuous rib and the second discontinuous rib are axially aligned; and the first discontinuous rib and the second discontinuous rib are spaced apart in the circumferential direction.

The gas turbine engine of any preceding clause, wherein the plurality of ribs is integrally formed with the body.

The gas turbine engine of any preceding clause, wherein at least one rib of the plurality of ribs is positioned at a maximum vibration stress location of the body.

The gas turbine engine of any preceding clause, wherein at least one rib of the plurality of ribs is positioned at a maximum thermal stress location of the body.

A fluid duct, comprising: a body extending along a central axis and defining a lumen extending therethrough, the body having an inner surface and an outer surface, wherein the central axis defines an axial direction along the central axis, a radial direction perpendicular to the central axis, and a circumferential direction oriented rotationally about the central axis, wherein a wall thickness of the body is less than 50 mils; and a plurality of ribs integrally formed with the body and extending radially inward from the inner surface of the body, wherein the plurality of ribs extends fully about the inner surface of the body in the circumferential direction, wherein each of the plurality of ribs comprises: a radial rib thickness of less than 100 mils; and an axial rib width of less than 100 mils, wherein at least one rib of the plurality of ribs is positioned at a maximum vibration deflection location of the body, wherein at least one rib of the plurality of ribs is positioned at a maximum thermal stress location of the body.

What is claimed is:

1. A fluid duct, comprising:

a body extending along a central axis and defining a lumen configured to receive a first fluid extending therethrough, the body having an inner surface and an outer surface, wherein the central axis defines an axial direction along the central axis, a radial direction perpendicular to the central axis, and a circumferential direction oriented rotationally about the central axis; and an elongate rib positioned on the inner surface of the body and formed from a wall, the wall extending radially inward from the inner surface of the body to protrude from the body into the lumen and extending continuously along at least a portion of the inner surface of the body in the circumferential direction, the wall defining a channel extending through the elongate rib in a primary direction, wherein the channel is configured to receive a second fluid and isolate the second fluid from the first fluid.

2. The fluid duct of claim 1, wherein the elongate rib extends radially outward from the outer surface of the body.

3. The fluid duct of claim 1, wherein the elongate rib is a circumferentially discontinuous rib extending partially about the inner surface of the body in the circumferential direction.

4. The fluid duct of claim 1, wherein the elongate rib extends fully about the inner surface of the body in the circumferential direction such that the elongate rib fully encircles the lumen.

5. The fluid duct of claim 1, wherein the elongate rib has a substantially semicircular cross sectional shape.

6. The fluid duct of claim 1, wherein the elongate rib has a substantially trapezoidal cross sectional shape.

7. The fluid duct of claim 1, wherein the elongate rib has a substantially circular cross sectional shape.

8. The fluid duct of claim 1, wherein the elongate rib extends helically about the inner surface of the body.

9. The fluid duct of claim 1, wherein the elongate rib comprises struts disposed within the channel, the struts forming a lattice structure.

10. The fluid duct of claim 1, wherein the elongate rib comprises a gyroid surface disposed within the channel.

11. The fluid duct of claim 1, wherein the elongate rib comprises struts disposed within the channel, the struts forming an isogrid structure disposed within the channel.

12. A gas turbine engine, comprising:

a compressor section;

a turbine section; and a fluid duct fluidly coupled between the compressor section and the turbine section, the fluid duct comprising:

a body extending along a central axis and defining a lumen configured to receive a first fluid extending therethrough, the body having an inner surface and an outer surface, wherein the central axis defines an axial direction along the central axis, a radial direction perpendicular to the central axis, and a circumferential direction oriented rotationally about the central axis; and a plurality of ribs positioned on the inner surface of the body and extending radially inward from the inner surface of the body to protrude from the body into the lumen, each of the plurality of ribs defining a channel extending therethrough in a primary direction, wherein the channel is configured to receive a second fluid and isolate the second fluid from the first fluid.

13. The gas turbine engine of claim 12, wherein the plurality of ribs comprises a first rib and a second rib are positioned abutting each other in the axial direction.

14. The gas turbine engine of claim 12, wherein the plurality of ribs comprises a first rib and a second rib spaced apart from the first rib in the axial direction.

15. The gas turbine engine of claim 12, wherein the plurality of ribs comprises at least one circumferentially discontinuous rib extending partially about the inner surface of the body in the circumferential direction.

16. The gas turbine engine of claim 15, wherein:

the at least one circumferentially discontinuous rib comprises a first discontinuous rib and a second discontinuous rib;

the first discontinuous rib and the second discontinuous rib are axially aligned; and the first discontinuous rib and the second discontinuous rib are spaced apart in the circumferential direction.

17. The gas turbine engine of claim 12, wherein the plurality of ribs is integrally formed with the body.

18. The gas turbine engine of claim 12, wherein at least one rib of the plurality of ribs is positioned at a maximum vibration stress location of the body.

19. The gas turbine engine of claim 12, wherein at least one rib of the plurality of ribs is positioned at a maximum thermal stress location of the body.

20. A fluid duct, comprising:

a body extending along a central axis and defining a lumen extending therethrough, the body having an inner surface and an outer surface, wherein the central axis defines an axial direction along the central axis, a radial direction perpendicular to the central axis, and a circumferential direction oriented rotationally about the central axis, wherein a wall thickness of the body is less than 50 mils; and a plurality of ribs integrally formed with the body and extending radially inward from the inner surface of the body, wherein the plurality of ribs extends fully about the inner surface of the body in the circumferential direction, wherein each of the plurality of ribs comprises:

a radial rib thickness of less than 100 mils; and an axial rib width of less than 100 mils, wherein at least one rib of the plurality of ribs is positioned at a maximum vibration deflection location of the body, wherein at least one rib of the plurality of ribs is positioned at a maximum thermal stress location of the body.

* * * * *